(12) United States Patent
Kim et al.

(10) Patent No.: US 9,081,424 B2
(45) Date of Patent: Jul. 14, 2015

(54) INPUT DEVICE ERROR COMPENSATING METHOD AND TERMINAL FOR SUPPORTING THE SAME

(71) Applicant: Samsung Electronics Co., Ltd., Gyeonggi-do (KR)

(72) Inventors: Jinman Kim, Gyeongsangbuk-do (KR); Junhui Lee, Gyeongsangbuk-do (KR); Byungkyu Kim, Gyeongsangbuk-do (KR); Sungbin An, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 71 days.

(21) Appl. No.: 13/928,831

(22) Filed: Jun. 27, 2013

(65) Prior Publication Data

US 2014/0009445 A1  Jan. 9, 2014

(30) Foreign Application Priority Data

Jul. 3, 2012 (KR) ........................ 10-2012-0072018

(51) Int. Cl.
*G06F 3/033* (2013.01)
*G06F 3/0354* (2013.01)
*G06F 3/041* (2006.01)

(52) U.S. Cl.
CPC .......... *G06F 3/03545* (2013.01); *G06F 3/0418* (2013.01)

(58) Field of Classification Search
CPC ... G06F 3/0418; G06F 3/046; G06F 3/03545; G01D 5/20; H03K 17/95
USPC ................. 345/173, 174, 178, 179; 178/18.01–18.03, 18.07, 19.03
See application file for complete search history.

(56) References Cited

U.S. PATENT DOCUMENTS

| | | | | |
|---|---|---|---|---|
| 5,644,108 A | * | 7/1997 | Katsurahira et al. | 178/18.07 |
| 5,675,130 A | * | 10/1997 | Sekizawa | 178/18.07 |
| 5,748,110 A | * | 5/1998 | Sekizawa et al. | 341/5 |
| 2001/0001430 A1 | * | 5/2001 | Ely et al. | 178/18.03 |
| 2002/0041272 A1 | * | 4/2002 | Ohashi | 345/173 |

FOREIGN PATENT DOCUMENTS

KR  10-2011-0107496 A  10/2011

* cited by examiner

*Primary Examiner* — Stephen Sherman
(74) *Attorney, Agent, or Firm* — Cha & Reiter, LLC.

(57) ABSTRACT

A method of compensating an error of an input device and an apparatus thereof. An electromagnetic induction pen including a coil for electromagnetic induction spaced apart from a nib of the pen is prepared. A sensor board is provided in the apparatus in which a voltage or current for electromagnetic induction of the electromagnetic induction pen output. A disposition state of the sensor board is determined. The voltage or the current is adjusted and provided to the sensor board formed according to a sensed rotation state of the sensor board or terminal in order to compensate for an error generated due to a distance between the nib and the coil. An error is compensated for by allowing coordinates according to the electromagnetic induction formed on the sensor board and varied with the rotation disposition state of the sensor board to correspond to a position of the nib.

20 Claims, 9 Drawing Sheets

INPUT DEVICE ERROR COMPENSATING METHOD AND TERMINAL FOR SUPPORTING THE SAME

CLAIM OF PRIORITY

This application claims the benefit of priority under 35 U.S.C. §119(a) from a Korean patent application filed on Jul. 3, 2012 in the Korean Intellectual Property Office and assigned Serial No. 10-2012-0072018, the entire disclosure of which is hereby incorporated by reference in its entirety.

FIELD OF THE INVENTION

The present disclosure relates to input device error compensation. More particularly, the present invention relates to an input device error compensating method which supports an error compensation of an input to an electronic device.

BACKGROUND

Electronic devices, which include a portable terminal, are designed to support specific user functions and maintain a size sufficiently small in order for the user to carry around in a pocket or purse. The increased functionality and decreased size and power usage has caused portable terminals to become very popular to the general public. Further, in recent years, portable terminal referred to as "smart phones" that integrally supporting various user functions beyond voice and text have been introduced. Such a portable terminal provides an image corresponding to a user function through a display unit while supporting the user function. Thus, when a user accesses a specific user function, the user accesses the specific user function while looking at the image displayed through the display unit.

Meanwhile, a portable terminal according to the related art can be configured to support a writing or painting function through an electromagnetic induction pen. In this case, the induction pen supports a function of a terminal detecting a specific input signal while the pen is placed on a display unit according to display characteristics. Thus, in the state of gripping the pen, the user operates the pen on the display unit of the terminal to perform the writing function. Since there are many different angles at which each user grips pens, and users can be left-handed as well as right-handed, there is a user difference between points identified by the, the various ways the pen is held. The display unit and the terminal recognizes the position of the pen in a certain and the various different types of slanting causes an error while using the pen. In order to solve the problem, a scheme of applying a predetermined offset in consideration of the distance between a place of the pen and a nib of the pen has been proposed in the related art. However, although the proposed scheme can be suitable for a specific situation, it is difficult to suitably apply the scheme to various situations in which the terminal is operated and the pen is used. As a result, a currently used pen technique does not compensate for various errors and that are based user idiosyncrasies and characteristics, as well as the usage state of the particular terminal.

SUMMARY

The present invention has been made at least in part in view of some of the above problems, and provides an input device error compensating method which supports adaptive compensation of an error caused between a pen and a terminal in an input device, in which the terminal generates an input signal based on an electromagnetic induction pen, and a terminal for supporting the same.

In accordance with an exemplary aspect of the present invention, a method of compensating for an error of an input device includes preparing (providing) an electromagnetic induction pen including a coil for electromagnetic induction spaced apart from a nib and a sensor board to receive an output of a voltage or a current for the electromagnetic induction of the electromagnetic induction pen; identifying a disposition state of the sensor board; and performing at least one of: adjusting the voltage or the current provided to the sensor board according to a rotation disposition state of the sensor board in order to compensate for an error generated when using the pen due to a distance between the nib and the coil; and compensating for the generated error by allowing coordinates according to the electromagnetic induction formed on the sensor board and varied with the rotation disposition state of the sensor board to correspond to a position of the nib.

The terminal may comprise any of a tablet, phablet, smart phone, audio player. etc., just to name a few non-limiting possibilities.

In accordance with another exemplary aspect of the present invention, a terminal for compensating for an error of an input device includes a sensor board that receives an output of a voltage or a current for an electromagnetic induction from an electromagnetic induction pen, the electromagnetic induction pen including a coil for electromagnetic induction spaced apart from a nib; and a controller identifying a disposition state of the sensor board, the controller configured for performing at least one of: adjusting the voltage or the current provided to the sensor board according to a rotation disposition state of the sensor board in order to compensate for an error generated due to a distance between the nib and the coil; and compensating an error by allowing coordinates according to the electromagnetic induction formed on the sensor board and varied with the rotation disposition state of the sensor board to correspond to a position of the nib.

BRIEF DESCRIPTION OF THE DRAWINGS

The present invention will become more apparent to a person of ordinary skill in the art from the following detailed description in conjunction with the accompanying drawings, in which.

DETAILED DESCRIPTION

Exemplary embodiments of the present invention are described herein with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

Figure 1:
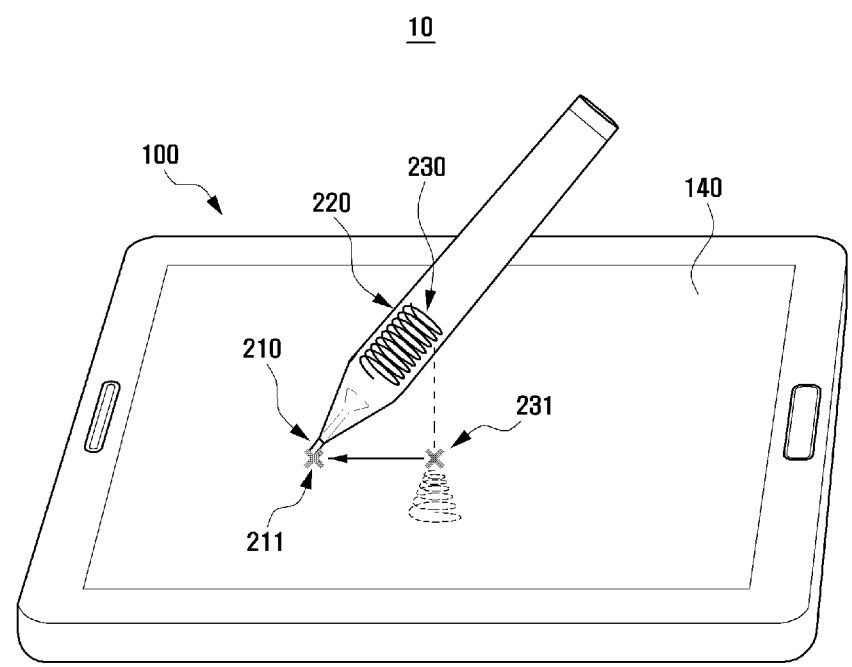
FIG. 1 is a view schematically showing a configuration of a terminal which supports a selective operation of a rotation function according to an exemplary embodiment of the present invention.
Figure 2:
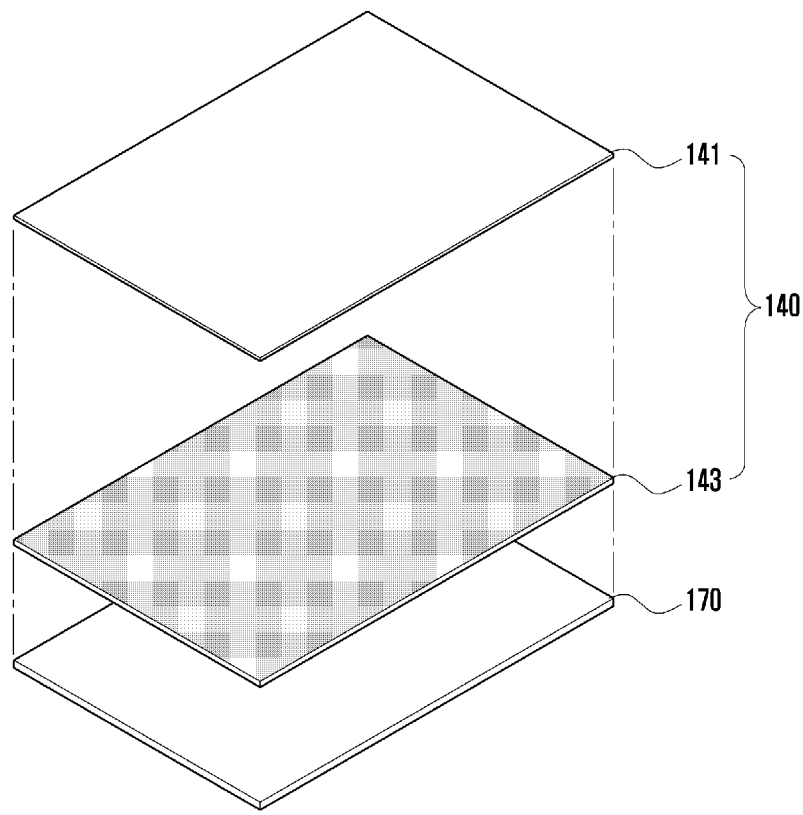
FIG. 2 is a view individually showing a display unit and a sensor board of FIG. 1.

FIG. 1 is a view showing a configuration of an input system 10 of providing an input device error compensation function according to an exemplary embodiment of the present invention. FIG. 2 is a view schematically showing a display unit and a sensor board of FIG. 1.

Referring now to FIGS. 1 and 2, the input system 10 according to an exemplary embodiment of the present invention may include a terminal 100 and a pen 200.

The input system 10 configured above according to the present invention provides generation of a specific input signal for the terminal 100 by using the pen 200.

Specifically, when the pen 200, which is supported to generate the input signal through an electromagnetic induction scheme, generates the input signal in cooperation with the terminal 100, the input system 10 recognizes different applications of at least one of a current intensity and a coordinate value according to a particular disposition angle of the terminal 100 with respect to the pen 200, such as a landscape or portrait position.

Thus, the input system 10 supports correctly recognizing the input signal generated by the pen 200 at various disposition states of the terminal 100. In other words, when a user uses the pen 200 to provide a specific input signal to the terminal 100, the input system 10 suitably outputs a graphic element corresponding to the input signal at a position of the display unit at which the pen 200 is touched, so that an error between the contact position of the pen 200 and the output graphic element may be adaptively removed.

As shown, the pen 200 may include a penholder 220, a nib 210 and a coil 230 for an electromagnetic induction scheme that in this example is disposed at an inner side of the penholder 220 in a region adjacent to the nib 210. The penholder 220 has a predetermined length and an inner hollow portion, which may comprise a cylindrical shape or another geometric shape. The front end portion of the penholder 220 may have a cone shape and a pointed end of the front end portion may have a through hole in which the nib 210 may be disposed. The nib 210 includes mutually connected portions, one such portion is an inner side of the front end portion of the penholder 220 and the other of which passes through the through hole of the pointed end of the penholder 220. The nib 210 may be made of an elastic material so as to provide a feel of using a real pen that has some degree of recoil, so that the nib 210 is pushed from the front end portion rearward when the nib 210 makes contact with a specific material. When the contact with the specific material is released, the nib 210 may be restored back to the original position. Meanwhile, the portion of the nib 210, which is disposed at the inner side of the front end portion of the nib 210, is supported by an elastic member and makes contact with the coil 230 provided at an inner side of the penholder 220 while the portion is being pushed rearward. When the nib 210 makes contact with the display unit 140, the nib 210 has a contact point 211 with the display unit, which is typically the lowermost portion of the nib.

The coil 230 is disposed at a region in the inner side of the penholder 220 having the inner hollow space and is arranged apart from the nib 210 by a predetermined gap. The coil 230 of pen 200 performs a function of generating an electromagnetic induction (e.g. induces a current) on a sensor board 170 (see FIG. 2) of terminal 100 by interaction with the sensor board 170 on which the display unit 140 is disposed. Thus, the coil 230 generates the electromagnetic induction on the sensor board 170 disposed in the terminal 100 so that an electromagnetic induction point 231 (FIG. 1) is formed. The coil 230 can be disposed toward the front end of the penholder 220. As described above, the coil 230 may be arranged within the pen 230 to make contact with a portion of the nib 210. Meanwhile, the shape, length and volume of the coil 230 are not limited to a specific physical construction, as the coil 230 can be constructed in various dimensions based on a quality of the sensor board 170 or a supplied current intensity. In other words, when the sensor board 170 (FIG. 2) is fabricated according to various conditions such as relative sensitivity or insensitivity, the size or quantity of the coil (or coils) 230 can be varied. Thus, the structure of the pen 200 according to this particular example is not limited to the shape of the nib 210, the type or shape of the penholder 220 and the size and place of the coil described above. Moreover, the structure of the pen 20 may be determined by an experiment for forming an electromagnetic induction in cooperation with the sensor board 170 disposed in the terminal 100.

With continued reference to FIG. 1, the terminal 100 includes a non-transitory memory and a hardware such as a controller (or microcontroller, etc.) that can execute various application programs, and a display unit including a display screen for operating the pen 200 (which is an input device) according to an exemplary embodiment of the present invention and outputting a graphic element for the operation of the pen 200.

More specifically, as shown in FIG. 2, the terminal 100 comprises a display unit 140 that preferably includes a touch panel 141, a display panel 143 and a sensor board 170. An artisan understand and appreciates there can be other layers there between. The terminal 100 can detect a position of the pen 200 by using the sensor board 170 and can compensate for an error of the detected position of the pen 20. For example, the terminal according to the present invention in this example identifies a disposition state of the device and varies an error compensation value applied to the pen 200 according to the disposition state.

More specifically, the terminal 100 can vary at least one of the current intensity and the coordinate compensation value provided to identify the position of the pen 200 according to various disposition states of the sensor board or the terminal 100 including a sensor board, such as forward landscape and longitudinal modes, or backward landscape and longitudinal modes. Thus, the terminal 100 according to this example can adaptively compensate for an error according to a user, or a disposition state of the terminal 100 when the input device in operation comprises the electromagnetic induction pen 200. Meanwhile, the touch panel 141 can be omitted from the terminal 100 according to the present invention according to a situation. In other words, as an invention for correcting a location error of the pen 200 of the present invention, the touch panel 141 can be omitted by intension of a designer (it is not an absolute requirement that the display unit also comprises a touch panel). An exemplary configuration of the terminal 100 will be described in more detail herein below with reference to FIGS. 3 and 4.

Figure 3:
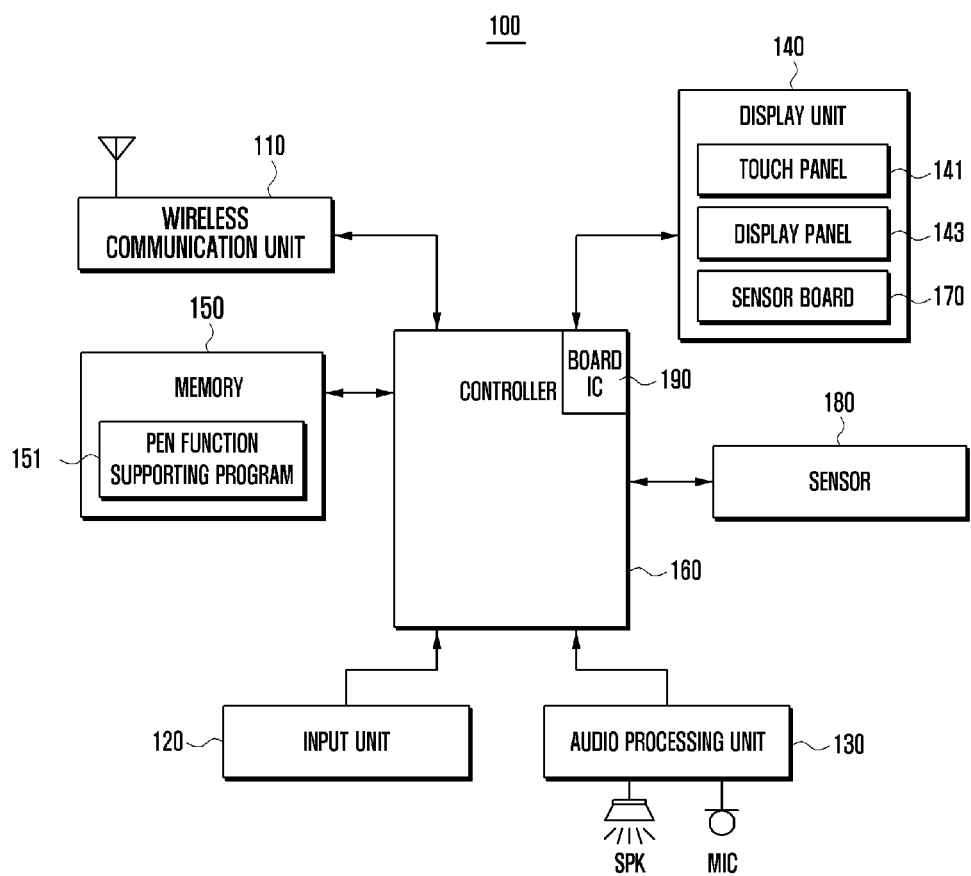
FIG. 3 is a block diagram showing in detail a configuration of a terminal according to an exemplary embodiment of the present invention.

FIG. 3 is a block diagram showing an exemplary configuration of the terminal 100 according to an exemplary embodiment of the present invention.

Referring now to FIG. 3, the terminal 100 according to the present invention as shown in this example includes a wireless communication unit 110, an input unit 120, an audio processing unit 130, a display unit 140, a sensor board 170, a memory 150, a sensor 180, and a controller 160.

The terminal 100 identifies a current disposition (orientation) of the terminal the pen 200 when the sensor board 170 senses the approach of the pen 200 within a predetermined distance of the terminal, or the pen 200 makes contact with the display unit 140 and which is sensed by the sensor board 170. The terminal 100 controls the voltage or current intensity applied to the sensor board 170 based on the current disposition state, and supports the electromagnetic induction of the coil 230 by using the controlled voltage or current intensity.

Further, the terminal 100 determines the coordinate compensation value of the input signal input from the pen 200 based on the current disposition state of the terminal so that the corresponding input signal may be operated according to the adaptive coordinate compensation value.

Meanwhile, as the communication unit 110, which may or be a wireless or wire communication unit comprising hardware including at least a transmitter, receiver, transceiver and may include a codec, serves as an additional element when the terminal 100 supports a communication function, However, in the event that the terminal 100 does not support (or provide) a communication function, the communication unit 110 can be omitted from the terminal 100, or its inclusion can be considered as optional. The communication unit 110 may be activated when an item prepared for supporting a communication function is selected by using the pen 200 and in addition, the communication unit 110 can be activated according to an input by a user through a finger as well as the pen 200.

In addition, the communication unit 110 can form a communication channel through which the voltage or current intensity value and the coordinate compensation value prepared for an operation of the pen 200 (to induce a current in the pen at a certain level, for example) is received from an external service apparatus. Although the voltage or current intensity value and the coordinate compensation value for the operation of the pen 200 are set while the terminal 100 is initially, fabricated, they can be subsequently provided or updated for the purpose of the management of the terminal 100 after the terminal 100 is released. When the communication unit 110 receives the voltage or current intensity value and the coordinate compensation value from an external service apparatus such as a specific service apparatus supporting the terminal management, the communication unit 110 can transfer such compensation values to the controller 160. When an error occurs by changing an operation property of the pen 200, the controller 160 can correct or compensate (solves) the error based on the received values.

The input unit 120 comprises hardware that is configured to generate various input signals necessary to operate the terminal 100. The input device 120 can comprise various types of input devices such as a keyboard, a keypad, mouse, or a key button according to compatibility with the terminal 100.

Further, when a touch screen serves as the display unit 140, the input unit 120 can comprise a type of a touch map output to the touch screen. More specifically, the input unit 120 of the present invention may generate an input signal that is received by the controller for activating or deactivating a user function associated with the pen 200 operation according to a request of a user, in which the controller will change or stop the display unit from outputting a certain energy level that is used to induce a current in the pen 200.

Further, the input unit 120 may generate an input signal for activating or deactivating a pen 200 error compensation function. In addition, the input unit 120 may generate an input signal for the purpose of conversion between right and left hand input modes according to a request of a user and may provide the input signal to the controller 160.

The audio processing unit 130, which comprises hardware such as an audio processor, can output various audio data set during the operation of the terminal 100, audio data according to the playback of the audio file stored in the memory 150, and audio data received from an outside. Further, the audio processing unit 130 may support a function of collecting audio data. To this end, the audio processing unit 130 can optionally include a speaker SPK and a microphone MIC. Specifically, while the position of the terminal 100 is being varied, for example, the screen of the terminal 100 is being rotated, the audio processing unit 130 can output a guiding sound or an effect sound corresponding to the position variation of the terminal 100. In the state that the terminal 100 is rotated, when the pen 200 approaches the terminal 100, the audio processing unit 130 may output a guiding sound or an effect sound corresponding to the approach of the pen 100. In lieu of or in addition to sound or vibration, a visual indication can also be provided.

Thus, the user can identify the audio data output from the audio processing unit 130 and can obtain information about the application state of the pen 200. The audio processing unit 130 can output sound effect for informing of the fact that the input signal is normally operated by the pen 200 while a specific text or image is being shown on the display unit 140 of the terminal 200. Meanwhile, the sound effect output from the audio processing unit 130 can be identically provided for the input signals by the pen 200 in the state that the terminal 100 is rotated. Further, the sound effects may be differently provided according to the input signals from the pen 200 according to the state in which the terminal 100 is rotated. For example, the sound effect corresponding to the input signal input from the pen 200 in the landscape mode can be set to be a different or distinguishable sound effect from, for example, the sound effect corresponding to the input signal input from the pen 200 in the longitudinal mode.

The display unit 140 provides a display of various images necessary to operate the terminal 100. For example, the display unit 140 can provide both a standby image and a menu image necessary to operate the terminal 100. More specifically, the display unit 140 of the present invention may display an image in a different direction as the user rotates the terminal 100. In other words, the display unit 140 may display an image in a direction corresponding to the current disposition state of the terminal 100 according to the sensor information input from the sensor 180 and under the control of the controller 160. For example, the display unit 140 may support image dispositions according to forward landscape and longitudinal modes, or backward landscape and longitudinal modes. The forward and backward directions are distinguished from each other based on the front of the user gripping the terminal 100. The display unit 140 can be comprised of many different types of constructions, including a thin film technology (TFT).

Meanwhile, the display unit 140 provides a mode setting image for determining whether or not the error compensation mode of the pen 200 of the present invention is applied. For example, the display unit 140 can provide a setting window including buttons for activating or inactivating the error compensation mode of the pen 200. Then, the user can determine through the setting window whether or not the function of varying the compensation value according to the rotation disposition of the terminal 100 is applied while the pen 200 is being operated.

The display panel 143 can output an image in a direction according to a user function operation. The display panel 143 provides a landscape mode image or a longitudinal mode image in a specific direction according to the rotation and may continuously maintain a state of displaying a specific mode image. The rotation can be sensed, for example, by motion sensors, or a gyroscope. The touch panel 141 can transfer a touch event together with information about a position, a touching degree and a touching period to the controller 160. The display unit 140 can include both a touch panel 141 and a display panel 143. The touch panel 141 can be configured to permit touch to cover the entire surface of the display panel 143, so that the display unit 140 may be formed in a full touch screen type. The touch panel 141 may support a function of selecting a specific element which is outputted on the screen and mapped with an image element outputted to the display panel 143.

Meanwhile, the image outputted on the display panel 143 may be mapped with the sensor board 170. Thus, a specific electromagnetic induction may be performed on the sensor board 170 by operating the pen 200 while a user is identifying the image outputted on the display panel 143. As a result, the electromagnetic induction on the sensor board 170 corresponds to the input signal generation. Since the input signal corresponds to the electromagnetic induction generated on the sensor board 170, the touch panel 141 and the sensor board 170 may be finally matched with the position of the display panel 143.

As described above, as the error compensation function of the pen 200 according to this example corrects the error of the pen 200 disposed on the sensor board 170, and can also be applied to a structure which is not employed in the touch panel 141.

With continued reference to FIG. 3, the sensor board 170 supports the electromagnetic induction by the coil 230 provided in the pen 200 and disposed at a lower portion of the display panel 143. In this particular case, the sensor board 170 provides a predetermined voltage or current under, which is control of the controller 160, in order to perform the electromagnetic induction of the coil and detect the induced electromagnetic wave. When the terminal 100 of the present invention supports a full touch, the sensor board 170 may have a size corresponding to the entire of the touch panel 143. When the terminal 100 supports a partial touch function, the sensor board 170 may have a size smaller than that of the touch panel 143. The operation of the sensor board 170 will be described in more detail with reference to the drawing described below.

The memory 150, which comprises a non-transitory machine readable medium, may store various types of machine executable code including operating systems necessary to operate the terminal 100 and data or application programs and algorithms corresponding to various user functions. These items will loaded into hardware such as a processor or microprocessor for execution. Specifically, the memory 150 can store a pen function supporting program 151 for supporting the error compensation function of the pen 200 according to the present invention.

The pen function supporting program 151 when loaded into and executed by hardware such as the controller 160 can include various routines for controlling operation of the pen 200 of the terminal 100. For example, the pen function supporting program 151 may include a routine for determining the rotation disposition status of the sensor board or the terminal 100 including the sensor board based on the sensor information collected by the sensor unit 180 and a routine for controlling the voltage or current provided to the sensor board 170 according to the sensor board or the rotation disposition state of the terminal 100. In addition, the pen function supporting program 151 may include machine executable code that when loaded into and executed by the controller will control collecting the input signal detected in the sensor board 170 in which the voltage or current is controlled, addition machine executable code for correcting the position of the detected input signal in the sensor board 170 according to the rotation disposition state of the sensor board or the terminal 100 including the sensor board, and for outputting the graphic element corresponding to the input signal to which the correction is applied.

The sensor unit 180 is configured to collect sensor information for supporting the rotation function of the terminal. The sensor unit 180 may include a sensor, such as an acceleration sensor, which can sense the rotation of the terminal 100. Thus, when the terminal 100 is disposed in a specific direction or a turnaround is caused in the state that the terminal 100 is disposed in a specific direction, the sensor unit 180 generates sensor information identifying the specific direction, etc. The sensor information can be transferred to the controller 160 such that the sensor information may be used as data for determining the rotation disposition state of the terminal 100. Meanwhile, the sensor unit 180 may include at least one of a plurality of different types of sensors including an acceleration sensor, a geomagnetic sensor and a Gyro sensor. The sensor 180 may remain active or can be activated in the state that the specific user function is activated, so that the rotation of the terminal 100 is sensed. Specifically, when the input signal for the activating the pen 200 function is generated, the sensor unit 180 is activated, so that the sensor 180 may generate sensing information according to sensing of the terminal 100 rotation and may transfer the sensing information to the controller 160.

The controller 160, which comprises hardware, is configured to control various signal flow and information collection and output necessary to support an error compensation function of the pen 200 according to an exemplary embodiment of the present invention. To this end, the controller 160 may include a board IC 190. As the board IC 190 is configured to operate the sensor board 170, the board IC 190 supports detection of the input signal due to the input electromagnetic induction. The input signal detected by the board IC 190 is transferred to any elements of the controller 160 so that the input signal can be used for the pen 200 error compensation. To this end, the controller 160 may include the configuration depicted in FIG. 4.

Figure 4:
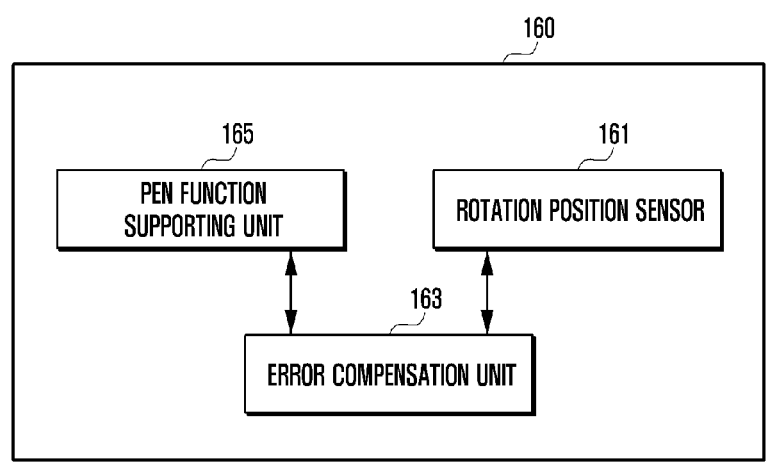
FIG. 4 is a block diagram showing an exemplary configuration of the controller of FIG. 3.

FIG. 4 is a block diagram showing the configuration of the controller 160 according to an exemplary embodiment of the present invention in detail.

Referring now to FIG. 4, the controller 160 of the present invention may include in addition to processing capability, a rotation position sensor 161, an error compensation unit 163 and a pen function supporting unit 165.

The rotation position sensor 161 identifies the current disposition state of the terminal 100 based on the sensor information provided from the sensor 180 and transfers the information to the error compensation unit 163. The rotation position sensor 161 may determine the disposition state of the terminal 100 based on the rotation angle of the terminal 100 with reference to the disposition state in a specific direction of the terminal 100, for example, the forward landscape mode.

For example, when the terminal 100 is rotated at a preset angle or is rotated more in a left direction with respect to the forward landscape mode, the rotation position sensor 161 may determine that the terminal 100 is disposed in the forward longitudinal mode. Further, when the terminal 100 is rotated at the preset angle or is rotated more in the right direction with respect to the forward landscape mode, the rotation position sensor 161 may determine the direction of the terminal 100 as the backward longitudinal mode. When the terminal 100 is rotated at a predetermined angle or more, for example, 180° to the left or right with reference to the forward landscape mode, the rotation position sensor 161 can determine the mode of the terminal 100 as the backward landscape mode. The rotation position sensor 161 can transfer information generated in each mode to the error compensation unit 163.

With continued reference to FIG. 4, the error compensation unit 163 compensates the error of the input signal collected based on the information related to the current disposition state of the terminal 100 and transferred from the rotation position sensor 161. To this end, the error compensation unit 163, which can include hardware such as a sub-processor configured for identifying at least one of the information about the voltage or current intensity value applied according to each disposition state of the terminal 100 and the information about the coordinate compensation, such that the error compensation unit 163 may perform the error compensation based on the information. The memory 150 may store the information about the voltage or current intensity value applied according to each disposition state of the terminal 100 and the information about the coordinate compensation. All of the aforementioned information can be set when the terminal is fabricated as described above or may be updated through an external input subsequent to manufacture or distribution.

The pen function supporting unit 165, which also comprises hardware such as a sub-processor or processor compensates the input signal transferred from the sensor board 170 by using the error compensation value transferred from the error compensation unit 163 after execution a processor or sub-processor of the error compensation unit, and outputs a graphic element corresponding to the compensated value. The pen function supporting unit 165 may map the error compensation value applied to the input signal with the layer output to the display panel 143, so that the pen function supporting unit 165 can identify whether the input signal is a signal of indicating a specific link function region, and then, the pen function supporting unit 165 can perform the link function activation according to the corresponding input signal. As a result, the pen function supporting unit 165 in this example controls the display panel 143 to display a specific text or image thereon according to the input signal error-compensated by the error compensation unit 163 and generated by the pen 200 according to the user function currently activated. When the error compensated input signal comprises an input signal for selecting a specific icon, widget, or virtual key button, the pen function supporting unit 165 performs a function corresponding to the corresponding icon, widget, or virtual key button.

Figure 5:
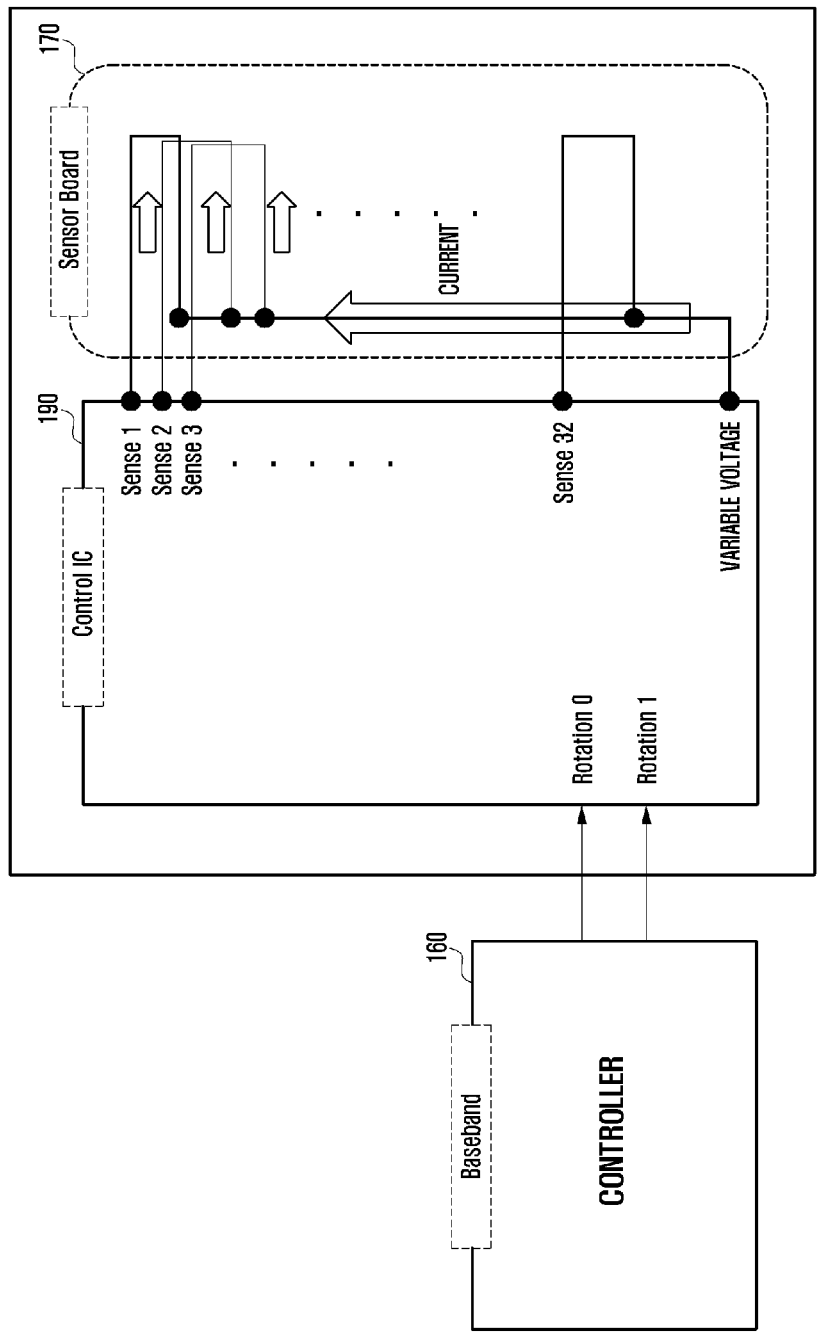
FIG. 5 is view illustrating configurations of a controller, a board IC and a sensor board according to an exemplary embodiment of the present invention.

FIG. 5 is a view showing a relation between the controller 160, the board IC 190 and the sensor board 170 of the terminal according to an exemplary embodiment of the present invention.

Referring now to FIG. 5, the board IC 190 is disposed (i.e. coupled, not required to be physically disposed) between the sensor board 170 and the controller 160 to detect the sensor signal from the sensor board 170 and to provide a current signal for operating the sensor board 170. Meanwhile, the board IC 190 may include two ports of "Rotation 0" and "Rotation 1" connected to the controller 160, and may adjust the voltage or current differently as the error compensation value provided to the sensor board 170 according to the signal transferred from the controller 160.

For example, the value for the error compensation may be defined as following Table 1.

TABLE 1

| Display direction | Vref | Reference compensation value |
|---|---|---|
| O | 1.65 V | A |
| 90 | 1.60 V | B |
| 270 | 1.60 V | C |
| 180 | 1.50 V | D |

For example, as shown in Table 1, when the display direction value is "0", the value of Rotation O is "0" and the value of Rotation 1 is "0", and thus, these values can signify in this state that the terminal 100 is disposed in the forward landscape mode. In this case, the board IC 190 may provide the current to the sensor board 170 with reference to the reference voltage of 1.65V. In other words, the board IC 190 can determine that the terminal 100 is currently disposed in the preset reference direction, for example, the forward landscape mode, and provide the current the determination result. When a relatively large current is provided compared with a reference voltage, the sensor board 170 can more sensitively perform electromagnetic induction with the pen 200. Thus, the adjustment of the current intensity provided to the sensor board 170 is preferably provided in a suitable form in cooperation with the coordinate compensation value. Preferably, when the terminal 100 is in the disposition state in which the user most frequently operates the terminal 100, the controller 160 can more sensitively apply the input by the pen 200, so that a non-detection error, which may be generated during the detection of the induced electromagnetic wave, can be reduced. Meanwhile, the coordinate compensation value "A" denoted in Table 1 can be varied according to the variation of an amount of provided current according to the disposition state of the terminal 100. As a result, when the sensor board 170 is operated based on the largest reference voltage, the amplitude of "A" in Table 1 can relatively have the largest value compared with other coordinate compensation values.

Meanwhile, when the value of Rotation 0 is "0" or "1" and the value of Rotation 1 is "1" or "0", the board IC 190 can control the reference voltage to 1.60 V and can control the current supply based on the reference voltage. In other words, the board IC 190 may determine that the terminal 100 is in the forward longitudinal mode or the backward longitudinal mode and thus perform the pen 200 error compensation through the current supply according to the determination result. Although the coordinate compensation values applied in this case are denoted as "B" and "C", respectively, since the two coordinate compensation values are operated based on the same voltage as a reference, the values can be similar with or equal to each other and the applied positions may be different from each other.

Further, when the value of Rotation 0 is "1" and the value of Rotation 1 is "1", the terminal 100 in this example can have a disposition state opposite to the early forward landscape mode. In this case, the board IC 190 can provide a relatively minimum reference voltage, and the controller 160 can apply the value "D" as the coordinate compensation value. When the relatively minimum reference voltage is supplied, the electromagnetic induction gap difference between the nib 210 and the coil 230 formed between the pen 200 and the sensor board 170 can be formed at a minimum, and thus, the relatively minimum value in this example is applied as the coordinate compensation value of "D".

As described above, the sensor board 170 performs the electromagnetic induction with the pen 200 based on the current provided from the board IC 190. Then, the board IC 190 can transfer a position value of the detected electromagnetic wave, that is, the input signal value to the controller 160. Then, the controller 160 can perform the error compensation by applying the coordinate compensation value defined according to the disposition direction of the terminal 100 to the input signal value transferred from the board IC 190. As described above, the error compensated input signal can be used for the graphic element output or a specific link function operation under control of the controller 160. The current value adjustment according to each disposition state applied to the terminal 100 according to the present invention may be modified in a plurality of values according to the intension of a designer. Generally, in the terminal 100 including the display unit has a rectangular or substantially-rectangular shape, the region which the gripped hand occupies in the longitudinal mode is small as compared with that in the landscape mode, and the state of gripping the pen 200 in the forward landscape mode can be different from that in the longitudinal mode.

For example, the pen 200 can be inclined at about 90° with respect to the front of the display unit 140 in the landscape mode in the state of gripping the pen 200, and to the contrary, the pen 200 may be inclined at an angle less than about 90° with respect to the front of the display unit 140 in the longitudinal mode. This state can be varied according to the size of the display unit 140 of the terminal 100. For example, when an entire palm is on the display unit 140, this typically indicates that the pen 200 is more vertically gripped relative to an ideal or previously identified grip. When the palm is placed beyond the display unit 140 or supported against a desk, the pen 200 may be more horizontally gripped. As a result, the angle between the display unit 140 and the pen 200, which can be varied according to the size of the display unit 140 of the terminal 100 and the type of pen 200 grip of a user, is taken into consideration so that a designer may design the voltage and current value adjustment based on various experimental results.

Although the board IC 190 shown in the present example is separate from the controller 160 that has been described above, the present invention is not limited thereto. As shown in FIG. 3, the board IC 190 can be integrated with the controller 160 as one element of the controller 160, or as shown in FIG. 5, can be fabricated as a separate element.

Figure 6:
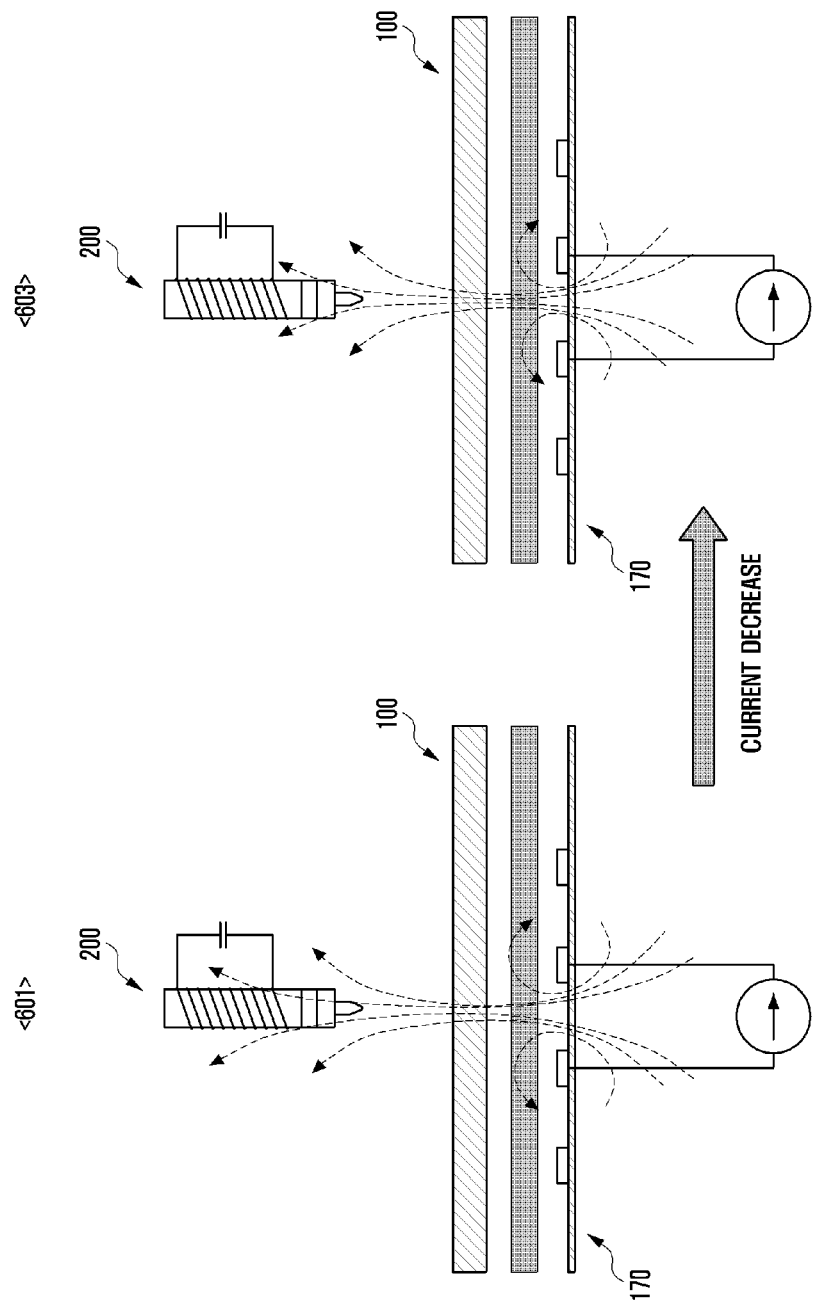
FIG. 6 is a view illustrating an electromagnetic induction variation according to a current variation of an input device according to an exemplary embodiment of the present invention.
Figure 7:
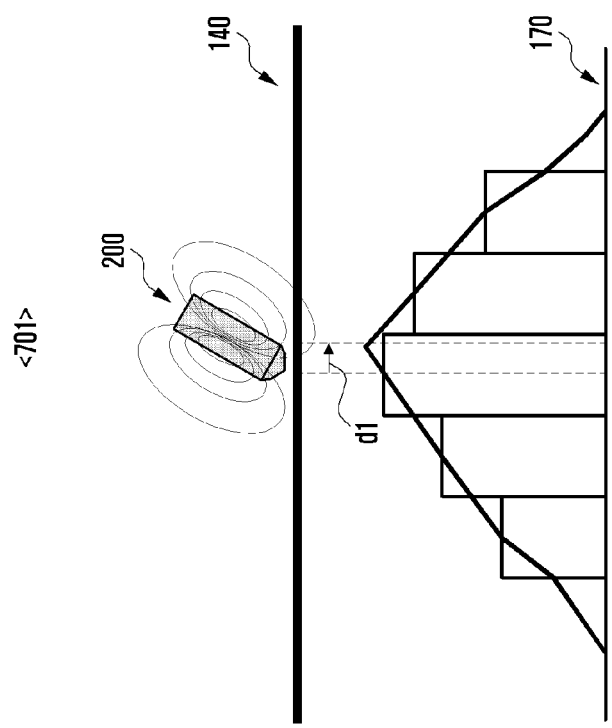
FIG. 7 is a view illustrating a variation of an amount of a detected error according to a variation of current according to an exemplary embodiment of the present invention.
Figure 7:
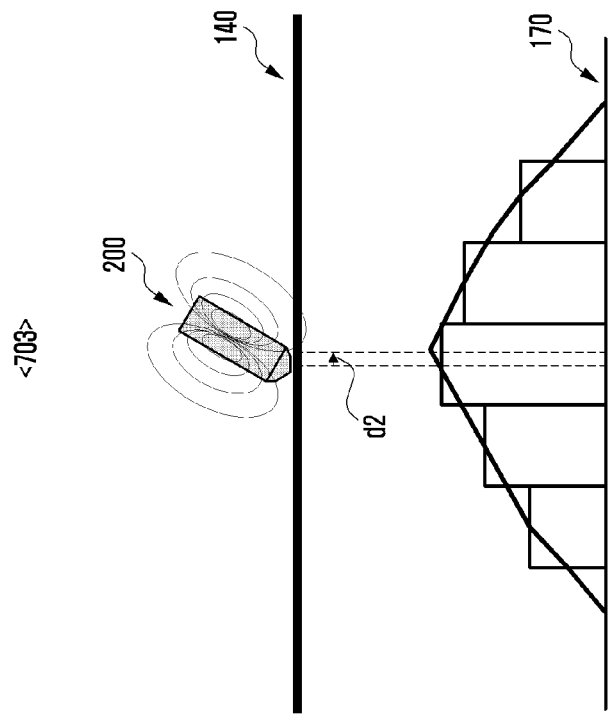

FIGS. 6 and 7 are views illustrating an example of error reduction according to a variation of a current provided to the sensor board 170.

Referring now to FIGS. 6 and 7, when a relatively larger current is supplied to the sensor board 170 as shown in the state drawing 601, the sensor board 170 performs the electromagnetic induction with the coil 230 of the pen 200 through the display unit 140. The electromagnetic induction by the relatively large current allows a distance difference value of "d1" between the nib 210 and the coil 230 to be detected as shown in the state drawing 701.

Meanwhile, with reference to FIGS. 6 and 7, when a relatively smaller current is supplied to the sensor board 170 as shown in the state drawing 603, although the sensor board 170 performs the electromagnetic induction with the coil 230 of the pen 200 through the display unit 140, a relative smaller electromagnetic induction occurs as compared with that of the state drawing 601. As a result, this phenomenon allows a relatively short distance difference value of "d2" between the nib 210 and the coil 230 to be detected as shown in the state drawing 703.

As described above, when the distance gap between the nib 210 and the coil 230 is varied according to the supplied current intensity, the coordinate compensation value to be compensated between the nib 210 and the coil 230 can be supported to be reduced. The reduction of the error gap between the nib 210 and the coil 230 can be reduced the user feel of the error difference which occurs while a letter is being input by using the real pen 200.

Figure 8:
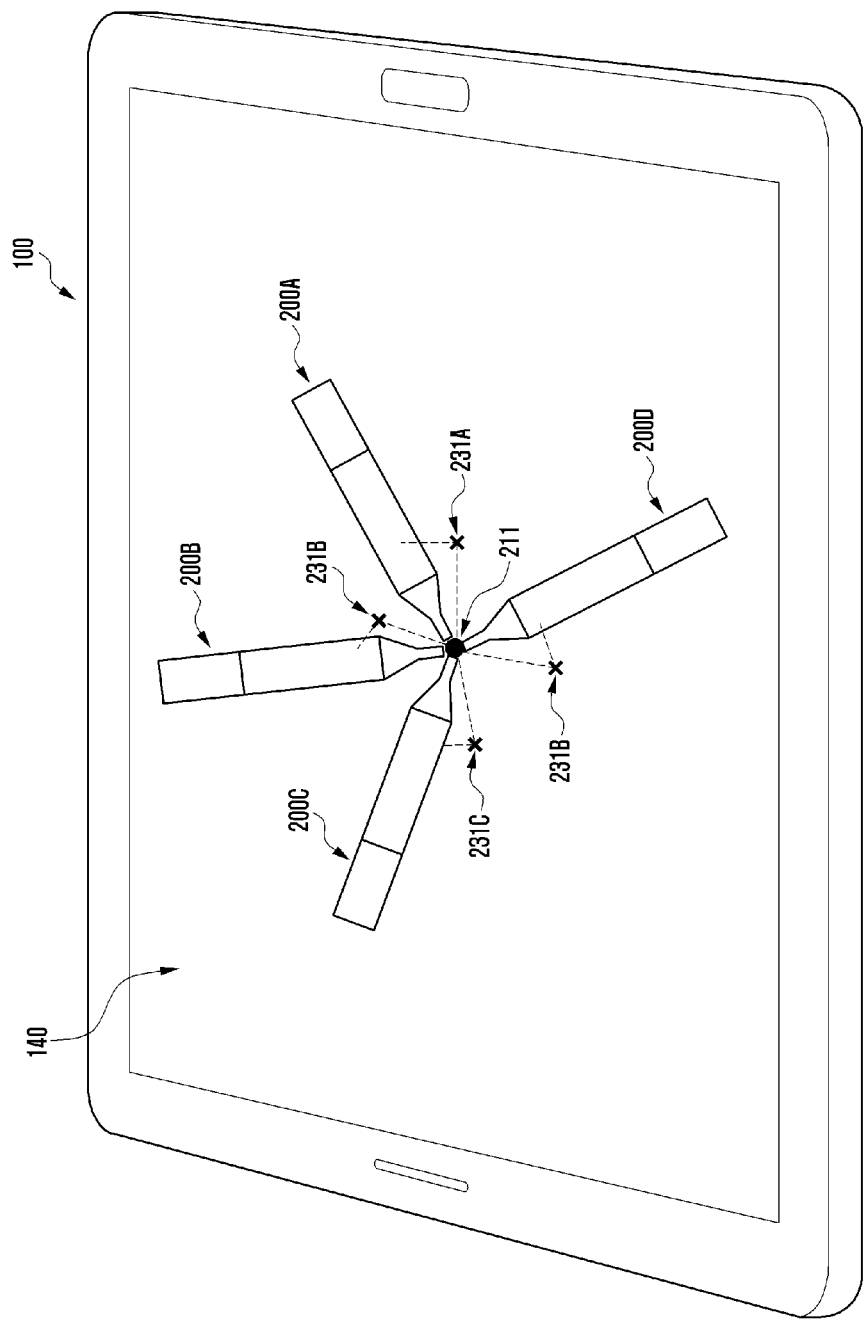
FIG. 8 is a view illustrating a coordinate compensation according to a disposition state between a pen and a terminal according to an exemplary embodiment of the present invention.

FIG. 8 is a view illustrating various examples of an error compensation of the pen 200 according to an embodiment of the present invention.

Referring now to FIG. 8, the input system 10 according to the present invention in this example preferably includes a terminal 100, a pen 200 disposed on a display unit 140 of the terminal 100, and the pen 200A, 200B, 200C, 200D may be disposed at various places on the terminal 100. In more detail, in the state that the terminal 100 is disposed in the forward landscape mode, when the user grips the pen 200 with the right hand, the pen may be operated as a first direction pen 200A. When the pen 200 is disposed as the first direction pen 200A, the nib 210 forms an electromagnetic induction point 231A while the nib 210 is making contact with a contact point 211 of the display unit 140. Then, the controller 160 of the terminal 100 identifies a coordinate compensation value in the forward landscape mode which is the disposition state of the terminal 100, and compensates the first electromagnetic induction point 231A with the corresponding coordinate compensation value, so that the position estimation for the contact point 211 is performed. When the position estimation is completed, the controller 160 determines that the input signal is generated at the estimated position and performs a function corresponding to the input signal. As one example, if it is assumed that the coordinates of the contact point 211 with which the nib 210 makes contact is (0, 0), the coordinates of the first electromagnetic induction point may be (1, −1). Thus, the coordinate compensation value may be a value which makes possible to allow the coordinates (1, −1) to move to (0, 0).

Meanwhile, when the terminal 100 is rotated at about 90° in the right direction in the forward landscape mode so that the terminal 100 is disposed in the forward longitudinal mode, the user may operate the pen 200 as a second direction pen 200B. The second direction pen 200B for performing a right hand grip forms a second electromagnetic induction point 231B by the coil 230 while the nib 210 is making contact with the same contact point 211. The controller 160 may identify the second electromagnetic induction point 231B and may estimate the contact point 211 by compensating the second electromagnetic induction point 231B with the corresponding coordinate compensation value. Meanwhile, when the terminal 100 is disposed in the forward longitudinal mode, the controller 160 limits the current provided to the sensor board 170 to a predetermined amount so that the second electromagnetic induction point 231B may be formed at a relatively closer point from the contact point 211. As a result, since the second electromagnetic induction point 231B can be formed near the contact point 211 through the current control, this is also applied to the coordinate compensation value so that the coordinate compensation value can be less than that of the first electromagnetic induction point 231A. For example, the coordinate compensation value of the second electromagnetic induction point 231B may be a value which makes possible to allow the coordinates (0.7, 0.7) to move to (0, 0).

In a way similar to that described above, the pen 200 can be gripped so that the pen 200 can be operated on the terminal 100 as a third direction pen 200C or as a fourth direction pen 200D. Then, the terminal 100 can detect a third electromagnetic induction point 231C and a fourth electromagnetic induction point 231D in each situation and can apply each coordinate compensation value to the third and fourth electromagnetic induction points 231C and 231D, so that an error compensation may be performed according to the disposition states of the terminal 100. For example, the coordinate compensation value of the third electromagnetic induction point 231C may be a value which makes possible to allow the coordinates (−0.7, 0.7) to move to (0, 0). Further, the coordinate compensation value of the fourth electromagnetic induction point 231D may be a value which makes possible to allow the coordinates (−0.5, −0.5) to move to (0, 0).

Meanwhile, the control of the voltage or current value applied to the sensor board 170 in the present invention can be varied according to a ratio adjustment between the landscape mode and the longitudinal mode, so that the error compensation can be more adaptively performed. As described above, the voltage or current value for controlling the sensitivity of the sensor board 170 may be controlled according to the size or ratio of the display unit 140 of the terminal 100 and the pen 200 gripping characteristics of a user, and as a result, the applied coordinate compensation value can be varied according to the control value.

Figure 9:
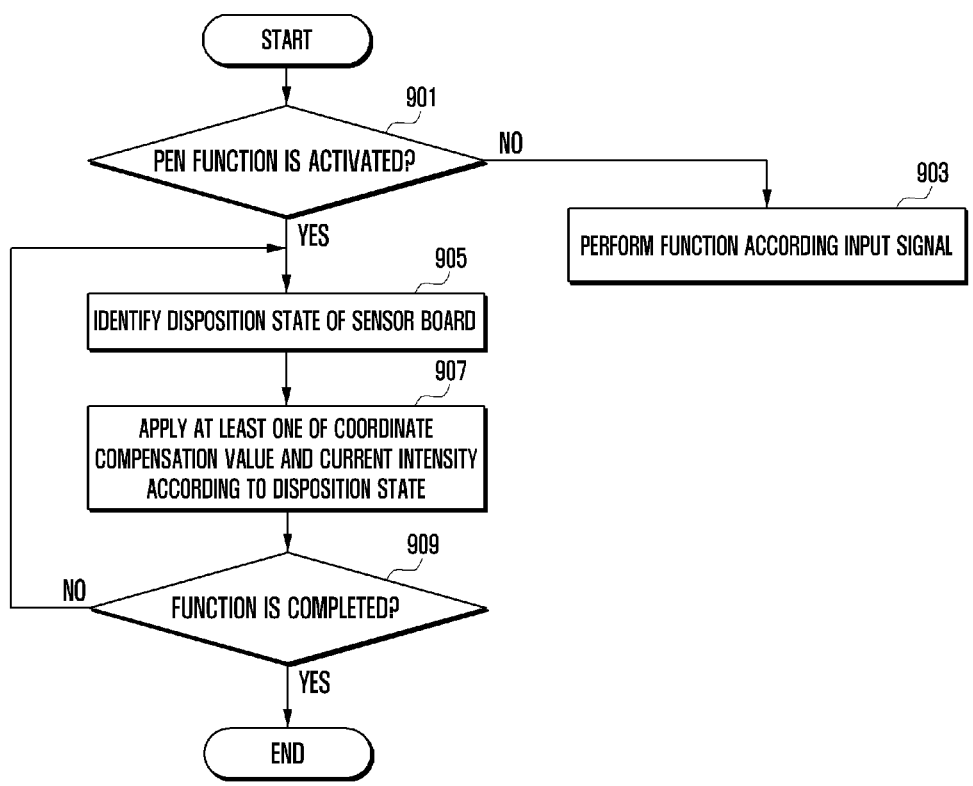
FIG. 9 is a flowchart illustrating exemplary operation of a method of compensating an error of an input device according to an exemplary embodiment of the present invention.

FIG. 9 is a flowchart illustrating exemplary operation of a method of compensating an error of an input device according to an exemplary embodiment of the present invention.

Referring now to FIG. 9, according to the method of compensating an error of an input device of the present invention, the controller 160 maintains the states of each element of the terminal 100 by using the supplied power.

At (901), the controller identifies whether or not an input signal or preset schedule information is for activating a pen function. If at (901) the input signal or preset schedule information is not associated with activating the pen function, then at (903) the controller 160 performs the function corresponding to the input signal. For example, the controller 160 can support a communication function, a file reproduction function, a file searching function, and a web connecting function according to the input signal.

Meanwhile, if at (901) the input signal determined to be an input signal generated for activating the pen function, then at (905) the controller 160 identifies the disposition state of the terminal 100. To this end, the controller 160 can activate the sensor unit 180 and identify which disposition state the terminal 100 is in based on the sensor information collected by the activated sensor unit 180.

Then at (907), the controller 160 applies at least one of the coordinate compensation value and the current intensity according to the disposition state of the terminal 100 so that error compensation of the pen 200 may be performed. In more detail, the controller 160 identifies the coordinate compensation value and the current intensity according to the disposition state of the terminal 100 predefined and stored in the memory 150. The controller 160 can apply the coordinate compensation value and the current intensity value to the input signal corresponding to the electromagnetic position value induced by the pen 200, so that the compensated input signal can be generated. The controller 160 may support to perform a graphic element output or a specific link function according to the compensated input signal.

Meanwhile, when the current intensity is designed to apply the same value according to the disposition state of the terminal 100, the controller 160 may apply the coordinate compensation to the input signal according to the electromagnetic induction. In this case, the controller 160 may apply coordinate compensation values, the application positions of which are different from each other and which are equal to each other, to the input signals according to the disposition states of the terminal 100. Meanwhile, when the values of the current intensity are different from each other, the controller 160 in this example applies the coordinate compensation values, which are different from each other according to the amplitude and direction, to the input signals collected through the electromagnetic induction so that the input signal compensation may be formed.

As described above, the method of compensating an error of an input device according to an exemplary embodiment of the present invention may basically apply coordinate compensation values in different directions according to the disposition states of the terminal 100, so that the input signals by the pen 200 may be correctly applied even if the disposition state of the terminal 100 is varied. Further, the method of compensating an error of an input device according to the present invention may control the voltage or current intensity according to the disposition state of the terminal 100, so that the error caused by the pen 200 may be preferentially reduced and the coordinate compensation value according to the reduced error can be applied, so an error compensation may be more adaptively performed.

Meanwhile, in some cases, the method of compensating an error of an input device according to the present invention can control such that the error generation can be minimized by applying only a variation of the voltage or current intensity according to the disposition state of the terminal 100 without applying of the coordinate compensation value according to directions. For example, the error that is caused by the spaced distance between the nib 210 and the coil 230 can be corrected by controlling the voltage or current intensity, so that the sense difference between the graphic element displayed on the display unit 140 and the nib 210 of the pen 200, which is felt by a user, can be minimized.

The foregoing terminal 100 may further include various additional modules according to provision forms. In other words, when the mobile terminal 100 is a communication terminal, there are constructions that were not mentioned above, such as a near field communication module for near field communication, an interface exchanging data in a wired communication scheme or a wireless communication scheme of the mobile terminal 100, an Internet communication module communicating with an Internet to perform an Internet function, and a digital broadcasting module receiving and broadcasting digital broadcastings. Since the structural elements can be variously changed according to convergence trend of a digital device, no elements were listed herein. However, the portable terminal 100 may include structural elements equivalent to the foregoing structural elements. Further, the terminal 100 of the present invention may be substituted by specific constructions in the foregoing arrangements according to the provided form or from another structure. These substitutions can be easily understood to those skilled in the present art. Further, the terminal 100 according to an exemplary embodiment of the present invention may include various types of device having a communication module for supporting a data communication service. For example, the portable terminal 100 can include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

As described above, according to the method of compensating an error of an input device and the terminal of supporting the same according to the present invention, even if the portable terminal is variously operated while the electromagnetic induction pen is being operated and has various grip states according to each user, the present invention can perform the error compensation more adaptively and suitably when compared with the prior art.

The above-described methods according to the present invention can be implemented in hardware, firmware or as software or computer code loaded into hardware for execution, and which is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" or "microcontroller" constitute hardware in the claimed invention. Under the broadest reasonable interpretation, the appended claims constitute statutory subject matter in compliance with 35 U.S.C. §101 and none of the elements consist of software per se.

The terms "unit" or "module" as may be used herein is to be understood as constituting hardware such as a processor or microprocessor configured for a certain desired functionality in accordance with statutory subject matter under 35 U.S.C. §101 and does not constitute software per se.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of compensating for an error in an input signal received from an input device, the method comprising:
    providing by a sensor board a voltage or a current for an electromagnetic induction of an electromagnetic induction pen including a coil and a nib detected within a predetermined distance from the sensor board;
    identifying by a controller a disposition state of the sensor board in a preset reference direction comprising one of a forward landscape mode, a forward longitudinal mode, a backward longitudinal mode or a backward landscape mode; and the controller performing at least one of:
    controlling compensation of an error generated in the input signal due to a distance between the nib and the coil by adjusting the voltage or the current provided to the sensor board for the electromagnetic induction of the electromagnetic induction pen according to a rotation disposition state of the sensor board; and
    controlling compensation of an error in the input signal by matching coordinates according to the electromagnetic induction formed on the sensor board and varied with a respective coordinate compensation value associated with the preset reference direction, wherein the rotation disposition state of the sensor board corresponds to a position of the nib.

2. The method of claim 1, wherein the identifying of the disposition state comprises identifying a mode in which the sensor board is operational in from among a forward landscape mode, a forward longitudinal mode, a backward landscape mode and a backward longitudinal mode.

3. The method of claim 2, wherein controlling the compensation of the error in the input signal comprises providing different values of the voltage or the current to the sensor board according to the mode in which the sensor board is operational.

4. The method of claim 1, wherein controlling the compensation of the error of the input signal comprises decreasing or increasing the voltage or the current provided to the sensor board according to a predefined value when a disposition direction of the sensor board has changed.

5. The method of claim 4, wherein the controlling the compensation of the error of the input signal comprises decreasing or increasing a magnitude value of coordinate compensation according to a position of the pen as the voltage or the current is reduced.

6. The method of claim 1, wherein the controlling compensation of the error of the input signal comprises storing at least one of an adjustment value of the voltage or the current and a coordinate compensation value according to the position of the pen which is adjusted according to the adjustment of the voltage or the current.

7. The method of claim 1, further comprising outputting a specific graphical element according to the error compensated input signal.

8. The method of claim 1, further comprising performing a link function indicated by the error compensated input signal.

9. The method of claim 1, further comprising varying at least one of a current intensity and a coordinate compensation value provided to identify a position of the electromagnetic induction pen on the sensor board.

10. The method of claim 1, wherein the sensor board provides respectively different compensation of a position of the electromagnetic pen for left-handed and right-handed users.

11. An apparatus for compensating an error in an input signal of an input device, the apparatus comprising:
    a sensor board comprising a plurality of sensors that senses a position of an input device thereon according to an electromagnetic induction of the input device caused by a voltage or a current for an electromagnetic induction received by the sensor board; and
    a controller identifying a disposition state of the sensor board, the controller performing at least one of:
    adjusting the voltage or the current provided to the sensor board according to a rotation disposition state of the sensor board in a preset reference direction comprising one of a forward landscape mode, a forward longitudinal mode, a backward longitudinal mode or a backward landscape mode; and compensating for an error in the input signal by matching coordinates according to the electromagnetic induction formed on the sensor board and varied with a respective coordinate compensation value associated with the preset reference direction, wherein the rotation disposition state of the sensor board corresponds to a position of the input device on the sensor board.

12. The apparatus of claim 11, wherein the input device comprises an electromagnetic induction pen which includes a coil for electromagnetic induction, and a nib for positioning within a predetermined distance of the sensor board, in which the coil is spaced apart from the nib; and the controller controls at least one of adjusting the voltage or the current provided to the sensor board according to a rotation disposition state of the sensor board in order to compensate for an error in the input signal generated due to a distance between the nib and the coil;

compensating for an error in the input signal by matching coordinates according to the electromagnetic induction formed on the sensor board and varied with the rotation disposition state of the sensor board to correspond to a position of the nib.

13. The apparatus of claim 12, further comprising a memory storing at least one of an adjustment value of the voltage or the current and the coordinate compensation value according to the position of the pen which is adjusted according to the adjustment of the voltage or the current.

14. The apparatus according to claim 12, wherein the apparatus comprises a portable terminal including a transceiver for wireless communication, at least a display screen, wherein the display screen is disposed on the sensor board.

15. The apparatus of claim 11, wherein the controller identifies which mode the sensor board is in from among a forward landscape mode, a forward longitudinal mode, a backward landscape mode and a backward longitudinal mode.

16. The apparatus of claim 15, wherein the controller controls providing to the sensor board different values of the voltage or the current according to the mode of the sensor board.

17. The apparatus of claim 11, wherein the controller controls decreasing or increasing the voltage or the current provided to the sensor board according to a predefined value when a disposition direction of the sensor board is varied.

18. The apparatus of claim 17, wherein the controller controls compensating the coordinates by decreasing or increasing a magnitude value of the coordinate compensation according to a position of an electromagnetic induction pen as the voltage or the current is reduced.

19. The apparatus of claim 11, wherein the controller outputs a specific graphic element according to the error compensated input signal.

20. The apparatus of claim 11, wherein the controller performs a link function indicated by the error compensated input signal.

* * * * *